(12) United States Patent
Li

(10) Patent No.: US 11,070,712 B2
(45) Date of Patent: Jul. 20, 2021

(54) METHOD AND SYSTEM FOR CONTROL OF A DIGITAL CAMERA SYSTEM

(71) Applicant: PUWELL TECHNOLOGY LLC, New York, NY (US)

(72) Inventor: Jie Li, Zhejiang (CN)

(73) Assignee: PUWELL TECHNOLOGY LLC, New York, NY (US)

( * ) Notice: Subject to any disclaimer, the term of this patent is extended or adjusted under 35 U.S.C. 154(b) by 0 days.

(21) Appl. No.: 16/557,683

(22) Filed: Aug. 30, 2019

(65) Prior Publication Data

US 2021/0067681 A1 Mar. 4, 2021

(51) Int. Cl.
*H04N 5/232* (2006.01)
*G06F 3/01* (2006.01)

(52) U.S. Cl.
CPC ......... *H04N 5/23206* (2013.01); *G06F 3/017* (2013.01); *H04N 5/23296* (2013.01); *H04N 5/23299* (2018.08); *H04N 5/232933* (2018.08)

(58) Field of Classification Search
CPC ......... H04N 5/23206; H04N 5/232933; H04N 5/23299; H04N 5/23296; G06F 3/017
See application file for complete search history.

(56) References Cited

U.S. PATENT DOCUMENTS

| | | |
|---|---|---|
| 6,867,798 B1 | 3/2005 | Wada et al. |
| 6,890,110 B2 | 5/2005 | Kajino et al. |
| 9,213,220 B2 | 12/2015 | Fowler et al. |
| 10,165,157 B2 | 12/2018 | Carr et al. |
| 2011/0098083 A1* | 4/2011 | Lablans ............. H04N 5/23238 455/556.1 |
| 2013/0258129 A1* | 10/2013 | Burns ................ H04N 5/23258 348/222.1 |
| 2017/0264877 A1 | 9/2017 | Lee |
| 2017/0302852 A1* | 10/2017 | Lam .................... H04N 5/2254 |
| 2017/0366803 A1* | 12/2017 | Kerstein ............. H04N 5/2252 |
| 2019/0373187 A1* | 12/2019 | Chhuor ................... H04N 9/79 |

FOREIGN PATENT DOCUMENTS

| | | |
|---|---|---|
| EP | 0738075 B1 | 10/2000 |
| JP | 2016-511857 A | 4/2016 |
| KR | 10-2012-0105201 A | 9/2012 |
| KR | 10-2013-0068343 A | 6/2013 |
| KR | 10-2014-0086550 A | 7/2014 |

OTHER PUBLICATIONS

International Search Report and Written Opinion, PCT/US2020/047262, dated Nov. 11, 2020, 10 pages.

* cited by examiner

*Primary Examiner* — Mekonnen D Dagnew
(74) *Attorney, Agent, or Firm* — Nicholson De Vos Webster & Elliott LLP

(57) ABSTRACT

Embodiments of the invention include methods, systems, and software for control of digital camera systems. In one embodiment, a digital camera system includes a lens and an image sensor. The digital camera system is rotatable about a single axis, and the image sensor has more pixel sensors in a first orientation substantially parallel to the single axis than in a second orientation perpendicular to the first orientation. Additionally, an application, coupled to the digital camera system via a wireless network, is to control rotation of the digital camera system.

6 Claims, 9 Drawing Sheets

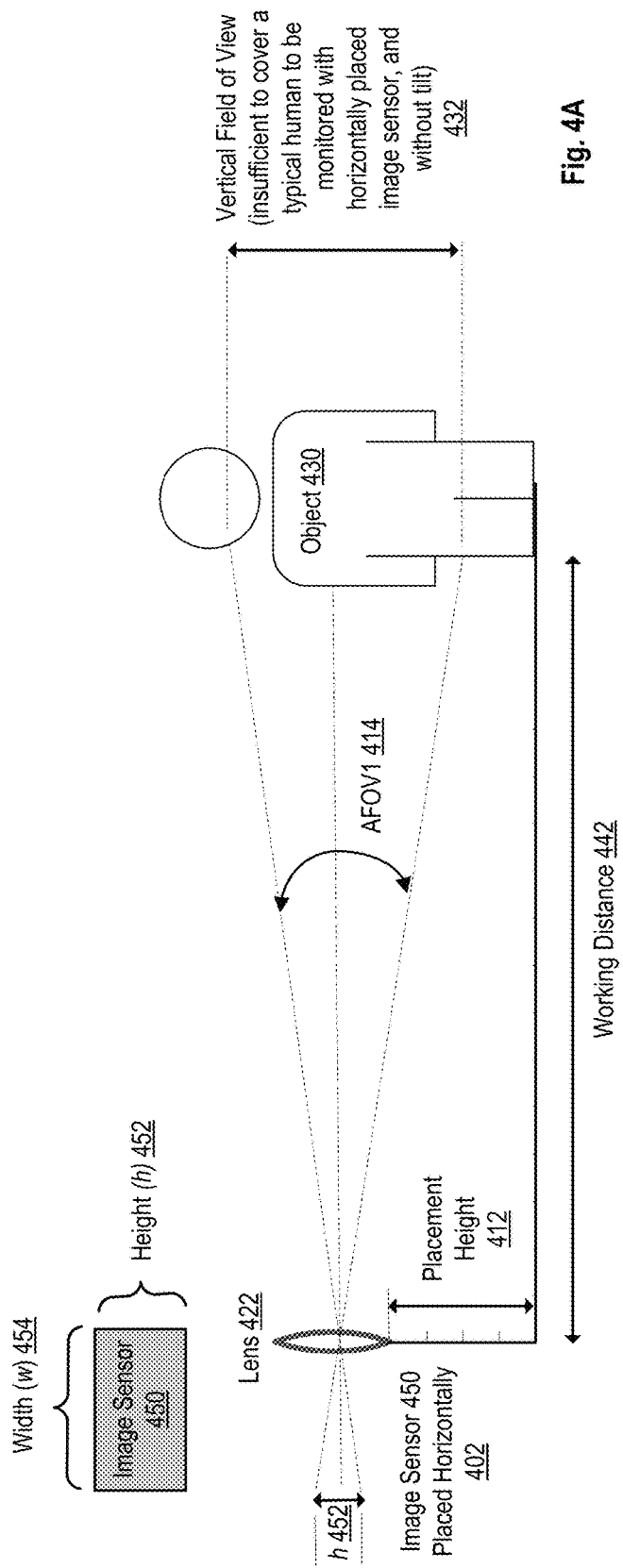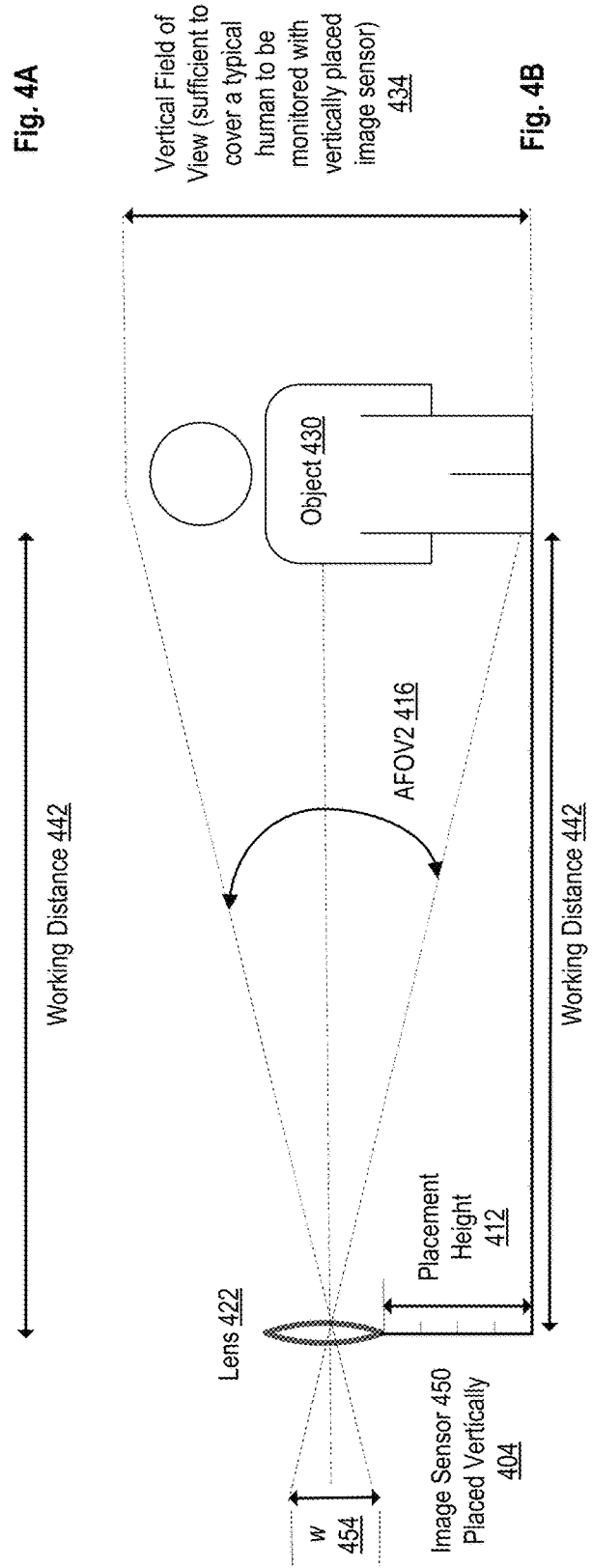
Fig. 4A
Fig. 4B

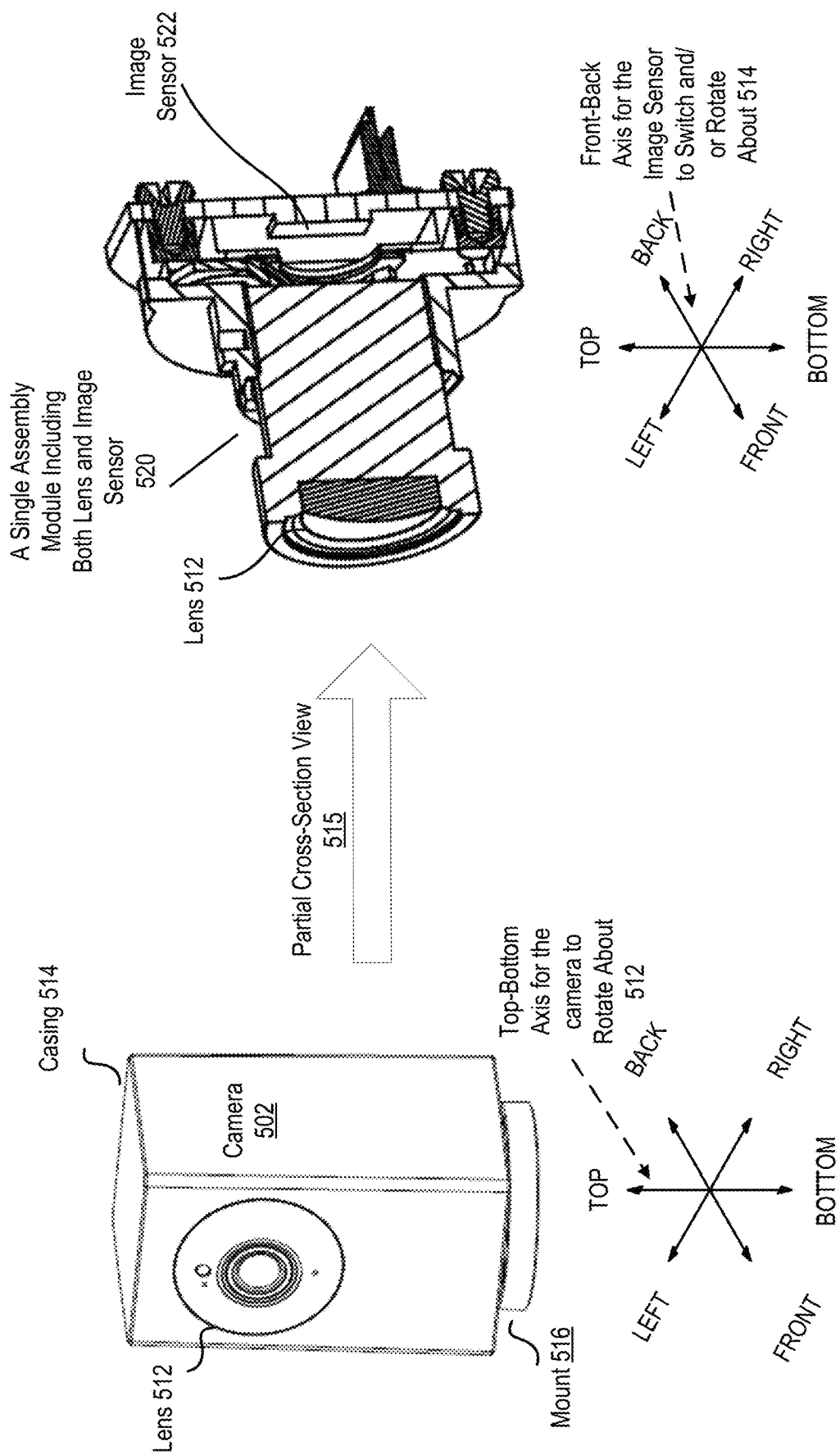

METHOD AND SYSTEM FOR CONTROL OF A DIGITAL CAMERA SYSTEM

TECHNICAL FIELD

Embodiments of the invention relate to the field of digital cameras and, more specifically, to control of a digital camera system.

BACKGROUND ART

Digital camera systems have gained wide usage in various industries. For example, they are used in applications such as surveillance, video conferencing, live production, lecture capture, and distance learning.

A pan-tilt-zoom (PTZ) camera is a popular option for digital camera systems. A PTZ camera may perform panning, i.e., swiveling the camera horizontally from a fixed position; it may perform tilting, i.e., rotating the camera up/down in a vertical plane from the fixed position; and it may perform zooming, i.e., adjusting the focal length of the lens of the camera. A PTZ camera may be controlled remotely, allowing an operator to monitor a large area and to pinpoint an area of interest within by panning, tilting, and zooming the camera to the area. The flexibility of the PTZ camera, however, comes with a high manufacturing cost.

SUMMARY

Embodiments of the disclosed invention include camera systems. In one embodiment, a camera system includes a lens and an image sensor. In one embodiment, the camera system is rotatable about a single axis and the image sensor has more pixel sensors in a first orientation substantially parallel to the single axis than in a second orientation perpendicular to the first orientation. Additionally, an application, coupled to the camera system via a wireless network, controls rotation of the camera system. In one embodiment, a single assembly of a camera system includes both lens and image sensor, and the single assembly is switchable between a first orientation and a second orientation perpendicular to the first orientation.

Embodiments of the disclosed invention include methods to control digital camera systems. Images are obtained using a lens and an image sensor of a camera system. In one embodiment, the camera system is rotated about a single axis, where an application, coupled to the camera system via a wireless network, is to control the rotation of the camera system. Additionally, the image sensor is oriented to have more pixel sensors in a first orientation substantially parallel to the single axis than in a second orientation perpendicular to the first orientation.

Embodiments of the disclosed invention include non-transitory machine-readable storage media for control of a digital camera system. In one embodiment, a non-transitory machine-readable storage medium provides instructions that, when executed, cause a mobile device to obtain images using a lens and an image sensor of a camera system; rotate the camera system about a single axis, where an application within the mobile device is to control the rotation of the camera system; and orient the image sensor to have more pixel sensors in a first orientation substantially parallel to the single axis than in a second orientation perpendicular to the first orientation.

Embodiments of the disclosed invention provide ways for control of a digital camera system. Because the digital camera system has a single axis about which the camera system can rotate, and the image sensor has more pixel sensors in the orientation substantially parallel to the single axis, the digital camera system has a greater coverage in the orientation without relying on fine-grained rotations in multiple axes.

BRIEF DESCRIPTION OF THE DRAWINGS

The invention may best be understood by referring to the following description and accompanying drawings that are used to illustrate embodiments of the invention. In the drawings:

FIG. 4A illustrates a first vertical field of view when an image sensor is placed horizontally.

FIG. 4B illustrates a second vertical field of view when an image sensor is placed vertically.

FIG. 5A illustrates a physical layout of a camera system according to one embodiment of the invention.

FIG. 5B illustrates a partial cross-section view of a camera system according to one embodiment of the invention.

DETAILED DESCRIPTION

Figure 1:
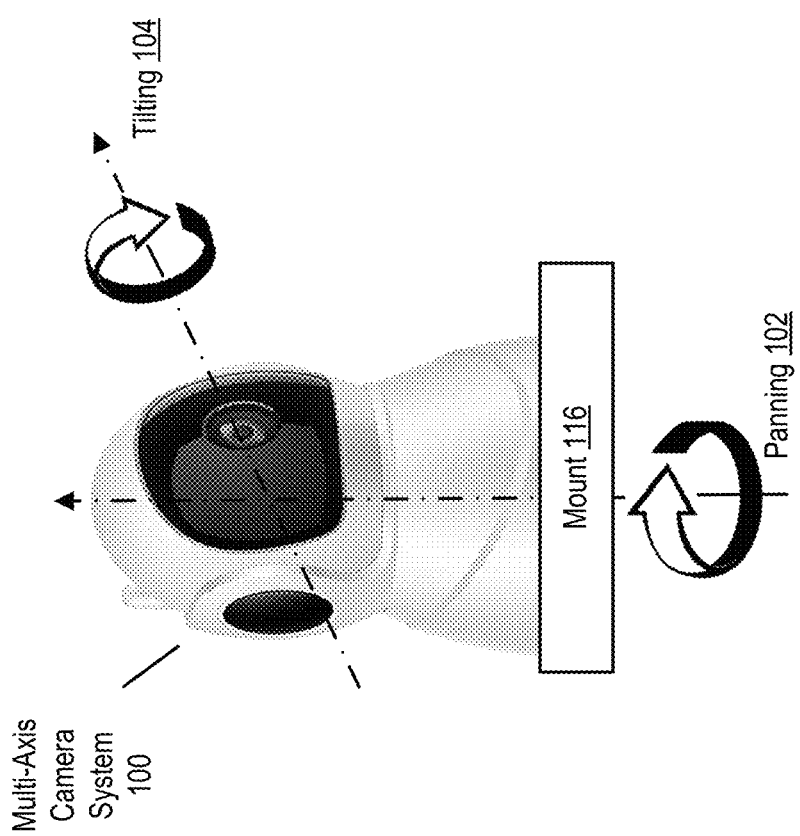
FIG. 1 illustrates a multi-axis camera.

Aspects of the present disclosure are directed to methods and apparatuses for control of a digital camera system. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention.

Bracketed text and blocks with dashed borders (e.g., large dashes, small dashes, dot-dash, and dots) may be used herein to illustrate optional operations or components that add additional features to embodiments of the invention. However, such notation should not be taken to mean that these are the only options or optional operations, and/or that blocks with solid borders are not optional in certain embodiments of the invention.

Terms

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. A "set," as used herein, refers to any positive whole number of items including one item.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the following description and claims, different terms about shapes, orientations, and directions are used. It should be understood that these terms cover shapes, orientations, and directions substantially similar/close to the shapes, the orientations, and the directions. Substantially similar/close means the deviation to the used shapes (e.g., rectangle/oblongs, circles, and spheres), orientations (e.g., portrait and landscape), and directions (e.g., parallel and perpendicular) is within, e.g., 5% of the respective values. For example, an orientation parallel to an axis means the orientation is within 4.5 degrees of the absolute parallel between the orientation and the axis. Additionally, a shape such as rectangle as described in this description includes a shape with round or sharp corners.

A digital camera is a camera that captures images and/or videos in digital memory such as the machine-readable storage media discussed herein relating to the definition of an electronic device. While a mobile device often incorporates a digital camera, the digital camera described in this Specification is a digital camera that is physically separated from a mobile device unless specified otherwise. A digital camera is an electronic device and it may include a network interface for communicating with another electronic device through a communication network. Unless specified otherwise, the digital camera (or simply referred to as camera) in this Specification has the network interface and is identifiable with one or more IP addresses.

Multi-Axis Digital Camera Systems

A multi-axis camera system is a popular choice for many applications such as surveillance, video conferencing, live production, lecture capture, and distance learning. FIG. 1 illustrates a multi-axis camera. The multi-axis camera 100 is coupled to a mount 116 that supports and/or maneuvers the multi-axis camera 100. The mount 116 may be set on a stable surface or other hardware (e.g., tripod) to control its movement. It is assumed that the mount 116 and/or the stable surface forms a placement plane for the multi-axis camera to be placed on. The multi-axis camera 100 may rotate about multiple axes. As shown, it may perform panning at reference 102, i.e., swiveling the camera horizontally from its fixed position about a first axis that is perpendicular to the placement plane. The panning may be about the first axis that is located at or near the center of the multi-axis camera 100. The panning may be driven by a motor within the multi-axis camera 100 and/or movement of the mount 116.

Additionally, the multi-axis camera 100 may perform tilting at reference 104, i.e., rotating the camera up/down in a vertical plane from a fixed position, and the axis for tilting is parallel to the placement plane for the multi-axis camera. The tilting may also be driven by a motor within the multi-axis camera 100 and/or movement of the mount 116.

Some embodiments of the multi-axis camera 100 may also perform zooming, i.e., adjusting the focal length of the lens of the camera. These multi-axis cameras are referred to as pan-tilt-zoom (PTZ) cameras, and they are commonly used in various applications.

Camera Systems in Embodiments of the Invention

Figure 2:
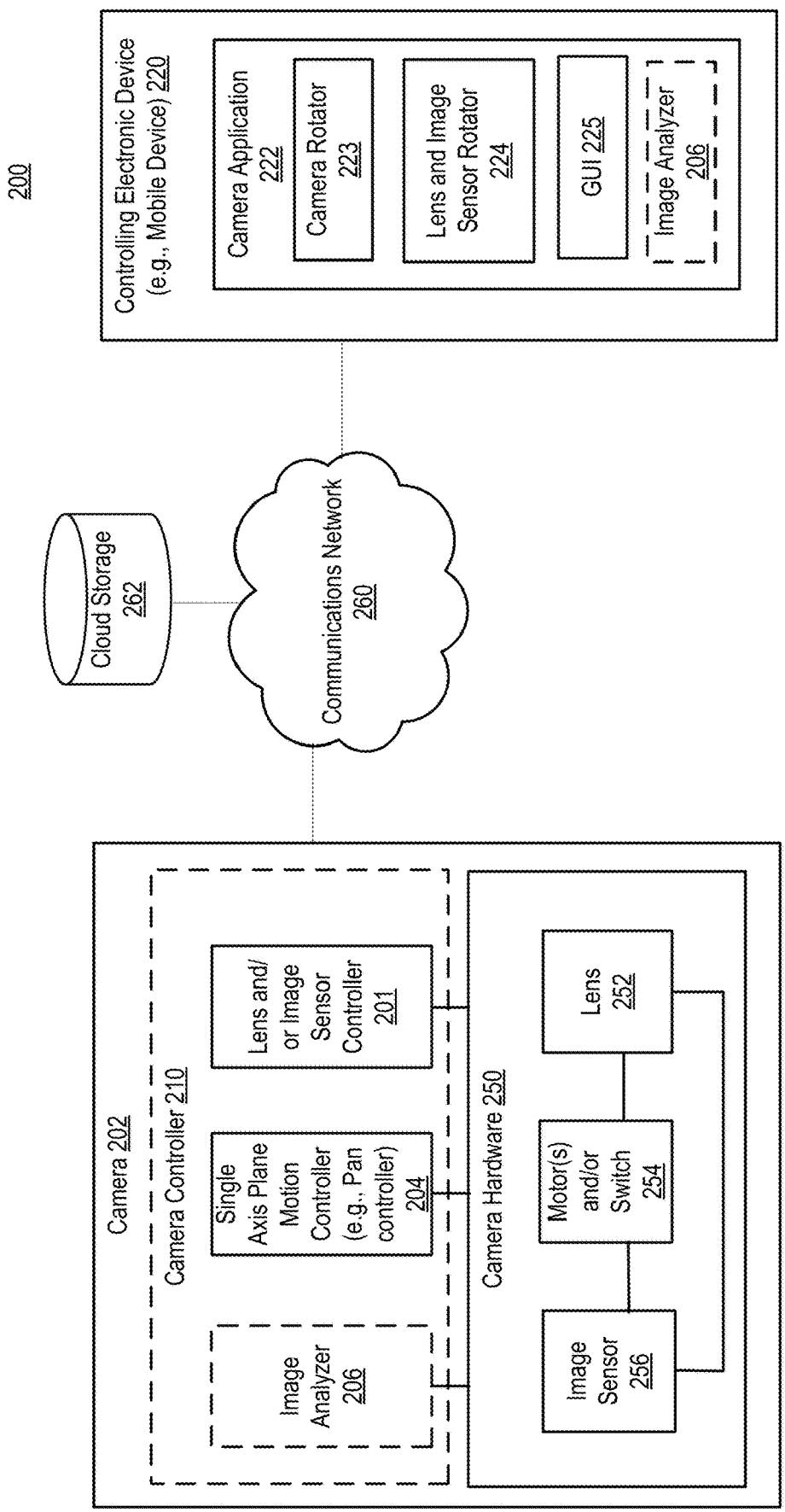
FIG. 2 illustrates a camera system according to one embodiment of the invention.

While a PTZ camera system offers great flexibility, the flexibility comes with costs and simpler camera systems may be implemented. FIG. 2 illustrates a camera system according to one embodiment of the invention. A camera 202 is communicatively coupled to cloud storage 262 and a controlling electronic device 220 via a communications network 260.

Each of the camera 202, the cloud storage 262, the controlling electronic device 220, and the communication network 260 may be manufactured, owned, and/or operated by a different party. For example, the communication network 260 is typically owned and operated by a telecom service provider, and it includes one or more wireless and/or wireline networks. The cloud storage 262 is typically owned and operated by a cloud service provider, and it may store and process images/videos captured by the camera 202.

The camera 202 is typically manufactured by a camera system vendor, which may also provide the controlling electronic device 220 and the camera application 222 within. Alternatively, the controlling electronic device may be manufactured by another party (e.g., a smartphone vendor), while the camera application 222 is provided by the camera system vendor. The system 200 may be implemented and maintained by an operator (e.g., a surveillance system operator and/or a video conferencing provider).

The camera 202 includes camera hardware 250 and camera controller 210. The camera hardware 250 includes lens 252, one or more motors and/or switch 254, and image sensor 256. The lens 252 may be a fixed focal length lens that has the ability to be focused for different distances. Alternatively, the lens 252 may also be a fixed focus lens that is intended for use at a single, specific working distance. One or more of the motors and/or switch 254 control the rotation of the camera 202 as a whole to rotate about a single axis (e.g., panning). Note that unless specified otherwise, in this Specification, switching/switchable refers to a rotation between two orientations, i.e., the operation has only two possible options (e.g., a binary operation between portrait and landscape orientations); while rotating/rotatable refers to a change of orientations with multiple alternative orientations (e.g., portrait, landscape, 45 degrees or other angles between the two, etc.). A switch may be a mechanical one (e.g., a knob) or an electronic one (e.g., using a motor), which causes the rotation between the two orientations.

In some embodiments, one or more additional motors/switch control the rotation of the image sensor 256. In some embodiments, a single assembly module (or simply assembly) includes both of the lens 252 and the image sensor 256, and the lens 252 and the image sensor 256 rotate together when the assembly is rotated/switched. The same assembly including lens 252 and image sensor 256 may also include other components of the camera, but the assembly is one component of the camera (i.e., not the whole camera), which may include components not rotatable by the rotation/switching of the single assembly. Such design is advantageous as it provides consistency between the lens 252 and the image sensor 256 in image capturing after rotation. For example, when the image sensor rotates while the lens does not, the image quality may deteriorate since the alignment between the image sensor and the lens may be broken after the rotation of the image sensor. With the same assembly including both lens and image sensor, the alignment between the lens and image sensor remains intact regardless the orientation of the image sensor.

The camera controller 210 controls movements of the camera 202 or components of the camera 202. The camera controller 210 includes a lens and/or image sensor controller 201 and a single axis plane motion controller 204. The lens and/or image sensor controller 201 causes the rotation of the lens and/or image sensor (e.g., the assembly described above). The single axis plane motion controller 204 causes the rotation of the camera 402 as a whole about a single axis (e.g., rotating the camera casing/housing about a mount axis). Additionally, the camera controller 210 may also include an image analyzer 206, which determines the coverage of the object to be monitored in real-time. The image analyzer may be additionally or alternatively implemented in the camera application 222.

The image analyzer 206 may identify features from captured images/videos without user input. For example, the image analyzer 206 may identify the locations of different parts of one or more human bodies to determine if the current image sensor orientation is sufficient to capture the human bodies. The image analyzer 206 may do so by identifying outlines of facial features, points of the facial features ("facial feature points"), arms, hands, and/or feet. The identified facial features may include mouth, eyes, eyebrows, nose, irises, pupils, teeth, lips, cheeks, hair, and T-zone (an area including the nose and across the forehead). If the image analyzer 206 determines that the coverage is insufficient to capture a human body (for example, it may determine that part of the face of a human body is not captured in an image), it may notify the single axis plane motion controller 204 and lens and/or image sensor controller 201 to cause the rotation of the camera 202 and/or the rotation of the image sensor until the human body or part thereof is fully included in a captured image, sequence of images, or video.

The image analyzer 206 may use techniques/tools such as artificial intelligence (AI), machine learning, and/or data visualization to determine the coverage of the objects to be monitored. In machine learning, a supervised learning algorithm may be used to identify a model through empirical learning to transform a set of inputs into a set of outputs. For example, a subset of inputs with corresponding outputs may be provided to the model to train the model. Once the model is identified, the model may be used to predict output for subsequent inputs. The model may include a plurality of coefficients, which when used in conjunction with system inputs, provide an output that is consistent with observed behaviors or status. The machine learning problems, such as identifying coverage of the objects to be monitored, may be cast as a convex optimization problem and solved by standard optimization tools.

The camera controller 210 coordinates with an application within the controlling electronic device 220 to control the operations of the camera hardware 250. The camera application 222 may be an application within a mobile device, in which case the application is a mobile application. A mobile application is also referred to as mobile software application, mobile app, or simply app and it is a software application designed to run on a mobile device. A mobile application runs directly on a mobile device (rather than through a web browser) once downloaded to the mobile device from an app store (also referred to as app marketplace). Alternatively, the camera application may be a desktop or a web application, through which an operator may control the camera 202, similar to the mobile application.

The camera application 222 includes a camera rotator 223, which coordinates with the single axis plane motion controller 204 to rotate the camera 202 as a whole (e.g., including casing and/or mount). The camera application 222 may also include a lens and image sensor rotator 224, which coordinates with the lens and/or image sensor controller 401 to rotate/switch the lens and/or image sensor.

Additionally, the camera application 222 may include a graphics user interface (GUI) 225. The GUI 225 may be a visual guide for a user of the camera application 222 to control the camera 202 (e.g., presented on a display device of electronic device 220). For example, the GUI 225 may include an icon for a switch, operating on which causes the image sensor to rotate from one orientation to another. The GUI 225 may include an icon for image sensor rotation/switching, operating on which causes the image sensor to rotate/switch. The GUI 225 may present images captured by the camera 202, and the user of the camera may use a (virtual or physical) control panel or a touch screen to control the rotations of the camera, image sensor, and/or the lens. The user may use gestures or voice commands to control the rotations. For example, the user may use finger taps or swipes of one or more fingers on the touch screen to control rotations. The user may also issue voice commands that may be interpreted by camera application 222 to control the rotations. For example, the camera application 222 may incorporate features of a virtual assistant (e.g., smart speakers), so that a user may speak to the controlling electronic device 220 with phrase such as the following: "OK, Camera, please rotate the sensor to a vertical position," which causes the image sensor of the camera 202 to rotate to the vertical orientation.

In one embodiment, the orientation of the image sensor may be controlled by the screen orientation of the mobile device 220 in which the camera application 222 is included. The two screen orientations of the mobile device that are the most common for the user to view the captured images/videos from the camera 202 include the portrait screen orientation and landscape screen orientation. In the portrait/vertical screen orientation, the mobile device is placed upright, with the height of the display screen is greater than the width (i.e., the mobile device is placed vertically). In the landscape/horizontal screen orientation, the mobile device is placed horizontally, with the width of the display screen is greater than the height. These orientations will be described further with reference to FIG. 6. By changing the orientation of the mobile device's screen, the user may cause the image sensor to be rotated to the same orientation. Thus, when the mobile device is rotated to a vertical orientation, the image sensor may follow and rotate to the vertical orientation. When the mobile device is rotated to a horizontal orientation, the image sensor may follow and rotate to the horizontal orientation.

Each of user gestures (fingers and mobile device rotation) and voice commands may cause the camera application 222 to send a single instruction (e.g., a message) to the camera 202, which causes the lens and/or image sensor controller 201 to perform rotation of the image sensor (and optionally the lens) to rotate from one orientation (e.g., landscape orientation) to another (e.g., portrait orientation). With the various ways that the camera application 222 controls the camera 202, the user may control the rotations of the camera 402 remotely with great flexibility.

Image Sensor Orientations and their Impact on Coverage

The embodiments of the invention control rotation of an image sensor in a camera system, and such rotation affects the coverage of the camera system significantly. A lens projects an image onto an image sensor, and the size of the projected image is based on the design of a lens. For example, in some implementations, a ⅔-inch lens has an image circle of around 11 mm and a ½-inch lens has an image circle of around 8 mm A lens is said to cover an image sensor when its image circle produces an image over the full sensor size. FIG. 3A illustrates the overlay of an image circle of a lens and an image sensor placed horizontally. The image circle of the lens at reference 350 covers the image sensor placed horizontally at reference 342. An image sensor is placed horizontally when its longer sides are parallel to the placement plane of the camera while its shorter sides are perpendicular to the placement plane (i.e., a landscape orientation).

The area under surveillance of a camera may be larger than the image circle. As shown in the figure, the surveillance area 370 is larger than the size of the image sensor in both horizontal (left-right) and vertical (top-bottom) directions. To monitor the surveillance area 370, a camera may use panning to cover the horizontal direction and tilting to cover the vertical direction. That is, to monitor the surveillance area 370 with the image sensor placed horizontally, a multi-axis camera such as a PTZ camera can be used.

Figure 3B:
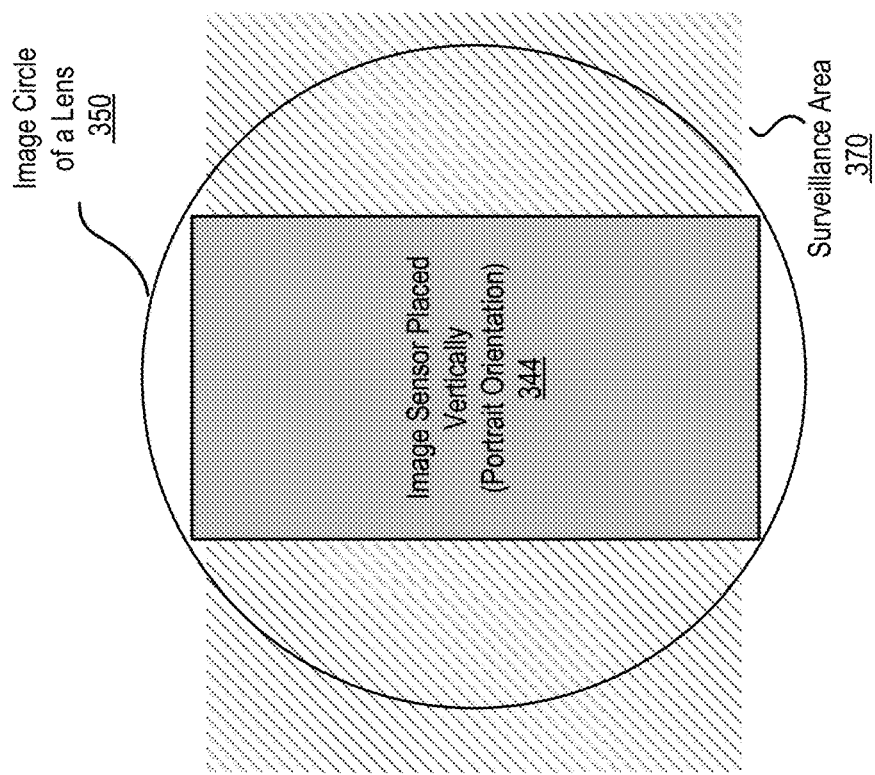
FIG. 3B illustrates the overlay of an image circle of a lens and an image sensor placed vertically.
Figure 3A:
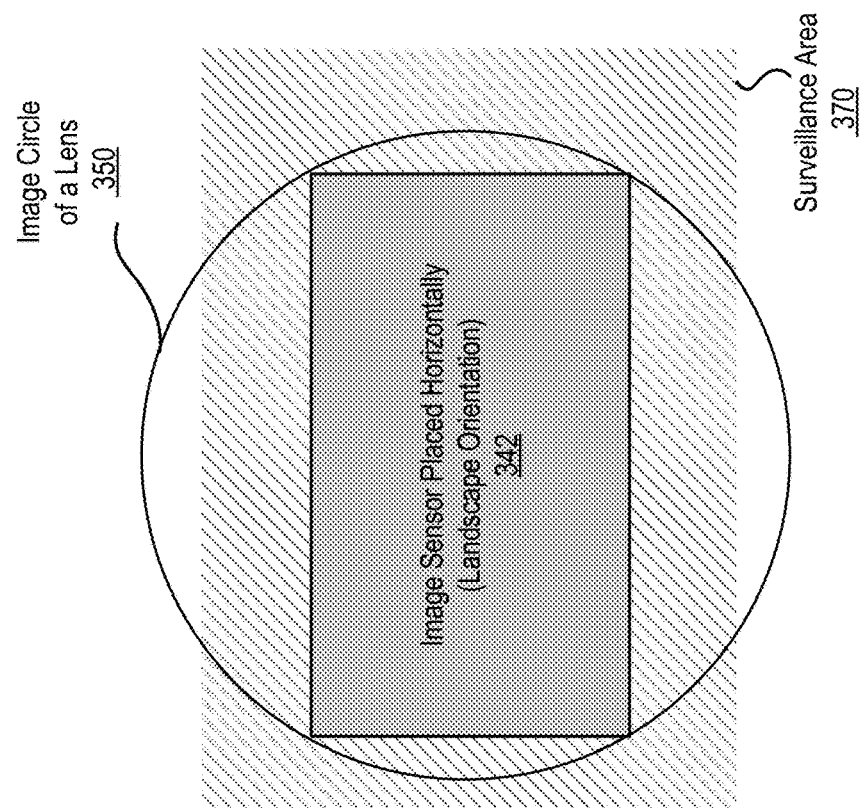
FIG. 3A illustrates the overlay of an image circle of a lens and an image sensor placed horizontally.

FIG. 3B illustrates the overlay of an image circle of a lens and an image sensor placed vertically. FIG. 3B is similar to FIG. 3A, but the image sensor is placed vertically at reference 344, where its shorter sides are parallel to the placement plane of the camera while its longer sides are perpendicular to the placement plane (i.e., a portrait orientation).

When the image sensor is placed vertically and the camera is used to monitor the same area, the camera no longer needs to use tilting as the height of the image sensor is sufficient to cover the height of the surveillance area 370. The camera, however, may perform additional panning (in comparison to the landscape orientation) since now it covers less horizontally when stationary. Yet such a drawback is reasonable because the multi-axis camera is no longer needed, and a simpler camera is sufficient to monitor the same surveillance area.

The impact of image sensor orientation on the field of view (FOV) of a camera is significant. The field of view is an observable range an observer (camera in this case) may see. For example, the angular field of view (AFOV) of a lens is related to its focal length (f) and vertical dimension (h) of the image sensor, and it may be calculated using the following formula:

$$AFOV = 2 \times \tan^{-1}\left(\frac{h}{2f}\right) \quad (1)$$

Let's assume the focal length of the lens is 3.6 mm and the image sensor has the dimensions of 4.8 mm and 3.6 mm (exemplary values for a ⅓-inch image sensor). For a horizontally placed image sensor, the AFOV is around 53 degrees, using the formula (1) above and plugging in h=3.6 mm and f=3.6 mm. On the other hand, if the same image sensor is oriented vertically, the AFOV is around 67 degrees. These image sensor orientations differ by 14 degrees in the angular field of view, which significantly changes the height of covered area, as shown in FIGS. 4A-B.

FIG. 4A illustrates a first vertical field of view when an image sensor is placed horizontally/in a landscape orientation. The image sensor 450 is rectangular in shape and it has a width 454 longer than its height 452. The image sensor 450 may work with a lens 422 to capture images/videos of an object 430. When the image sensor 450 is placed horizontally as shown at reference 402, its height 452 is parallel to the lens 422 on a plane perpendicular to the placement plane of the camera containing both image sensor and lens. The camera is placed at a placement height 412 and it captures images of the object 430 at a working distance 442. The angular field of view (AFOV) for the setting is AFOV1 at reference 414.

FIG. 4B illustrates a second vertical field of view when an image sensor is placed vertically/in a portrait orientation. FIG. 4B is similar to FIG. 4A but the image sensor 450 is placed vertically instead as shown at reference 404. Thus, the longer sides of the image sensor 450 (the sides along the image sensor width) are parallel to the lens 422 on a plane perpendicular to the placement plane. The AFOV for this setting is AFOV2 at reference 416.

As shown, the difference between AFOV1 and AFOV2 causes the difference of object coverage by the camera. The difference of object coverage can be illustrated using the exemplary ⅓-inch image sensor and the 3.6 mm focal length lens. As calculated above relating to formula (1) above, the AFOV1 is 53° and AFOV2 is 67°. Using a working distance is 1.5 meters, a common setting for surveillance or conferencing, the vertical height of the object 430 covered by the setting in FIG. 3A is around 1.5 meters (2×1.5×tan(53/2)≈1.5). With the vertical field of view being 1.5 meters (less than five feet), it is insufficient to capture the entire height of an average adult human. For example, when the placement height is 0.8 meters, the camera will not capture an image of the head and feet of the human body as indicated at reference 432. For applications such as surveillance, missing the head (showing the emotion/intent/identifiable features of the human) and feet (showing the movement of the human) is a significant shortcoming that makes the camera unsuitable for these applications, unless tilting is incorporated to cover the missing portion of the human body. In other words, a multi-axis camera is required to offer the sufficient coverage when the image sensor is placed horizontally.

In comparison, the vertical height covered by the setting in FIG. 4B (portrait orientation) is around 1.99 meters with the AFOV2 being 67° and the working distance 1.5 meters (2×1.5×tan (67/2)≈1.99). The vertical field of view of 1.99 meters (around six-foot-five-inch or 6'5") is sufficient to capture the entire height of an average adult human as indicated at reference 434. For reference, the average height for an adult male in the U.S. is around five-foot-nine-inch (5'9") and an adult female five-foot-four-inch (5'4") as shown in data compiled in the National Health and Nutrition Examination Survey (NHANES) conducted from 2007 to 2010.

With the sufficient coverage using the vertically placed image sensor, the camera does not need to perform tilting to capture an image of the full height of typical human bodies. That is, the multi-axis camera is no longer required to offer the sufficient coverage vertically. The advantage of not requiring tilting is significant, as it means that the camera may rotate about only a single axis (e.g., performing panning) and still offers the coverage required, as shown in FIG. 3B. In other words, with the image sensor placed vertically, a simpler camera (which supports panning but not tilting) may be sufficient for an application such as surveillance.

The simpler camera (e.g., camera 202) will cost less to design, manufacture, and maintain since the rotation of the whole camera about one axis is removed. In one embodiment, the image sensor is placed statically in the portrait orientation, in which case the only rotation by the camera is panning In another embodiment, the image sensor orientation can be dynamically rotated into the portrait orientation from another orientation (e.g., the landscape orientation).

The rotation of the image sensor is often simpler than tilting. For example, the rotation of the image sensor can be implemented through switching, where only two orientations are allowed (the portrait and landscape orientation). The rotation of the image sensor (without tilting of the whole camera) can also be steadier and/or slower than tilting of the whole camera. A commercial PTZ camera may tilt at the speed between 0.1° to 60° per second, and the tilting speed depends on various factors such as the object's movement and the vertical coverage the camera is required to obtain. The variable tilting speeds that a PTZ camera supports makes the PTZ camera challenging to design, manufacture, and maintain, since one or more motors with granular motion controls need to be included to control the tilting of the PTZ camera. Thus, the PTZ camera can be expensive.

In contrast, the rotation of the image sensor may be done only periodically and once it's in the desired orientation, it may stay in the orientation for some time (minutes or even hours instead of seconds). Comparing to tilting, the rotation of the image sensor is semi-static since it may be done only periodically without real-time orientation changes of orientation in tilting. The simpler rotation of the image sensor can be realized using a switch (e.g., switching between two pre-determined orientations) or a coarser-grained motor (coarser comparing to a motor for tilting). By using such simpler image sensor rotation, embodiments of the invention cost less to manufacture and maintain thus the resulting camera can be sold cheaper and be deployed in more applications.

FIG. 5A illustrates a physical layout of a camera system according to one embodiment of the invention. Camera 502 has a lens 512, a casing 514, and a mount 516. The mount 516 helps the lens 512 to rotate about a single axis. The image sensor 522 is included in the casing 514, thus not shown without a cross-section view 515. FIG. 5B illustrates a partial cross-section view 515 shows a single assembly module that includes both lens 512 and image sensor 522 according to one embodiment discussed herein above.

The orientation reference shows different orientations. A first axis is perpendicular to the placement plane of the camera 502. The axis may be located at the center of the camera 502, and it may be between the center of the top of the casing 514 and the center of the bottom of the casing 514. Alternatively, it may be another position about which the camera 502 is to perform panning. The first axis may be referred to as the top-bottom axis, which is parallel to a plane vertical/perpendicular to the placement plane, where the plane may thus be referred to as the vertical plane of the camera 502. A second axis is parallel to both the placement plane and the vertical plane, and it intersects with the first axis. Since it passes through the left and right side of the camera 502, it may be referred to as the left-right axis. A third axis is parallel to the placement plane but perpendicular to the vertical plane. The third axis intersects with and is perpendicular to both the first and second axis. Since it passes through the front and back of the camera 502, it may be referred to as the front-back axis.

The camera 502 may perform panning and rotate about the top-bottom axis. The panning causes the camera casing 514 to rotate. Yet the camera casing 514 can't perform tilting and rotate about the left-right axis, but instead the image sensor 522 (and lens 512 when both are included in a single assembly) may rotate about the front-back axis so that the image sensor may be placed vertically and extend its coverage vertically.

In some embodiments, the camera casing 514 may not rotate about the top-bottom axis (i.e., no panning) Instead, the image sensor rotates about the front-back axis to increase the vertical coverage of the camera 502. In these embodiments, the camera casing 514 does not rotate in any axis, yet the image sensor may be rotated/switched to achieve the optimal field of view. For example, the image sensor 522 and the lens 512 may be on a single assembly 520, and the single assembly 520 is rotatable/switchable between a first orientation and a second orientation perpendicular to the first orientation. In other words, the image sensor 522 may be rotatable/switchable between the two orientations (e.g., landscape and portrait orientations) regardless whether the camera casing 514 itself may be rotatable on other axes. The camera 502 may include a motor to cause rotation/switch. Alternatively, or additionally, the camera 502 may include a mechanical switch to cause the rotation/switch.

In these embodiments, the switch/rotation of the single assembly 520 may also be controlled by the controlling electronic device 220 using a camera application 222 as discussed herein.

Figure 5C:
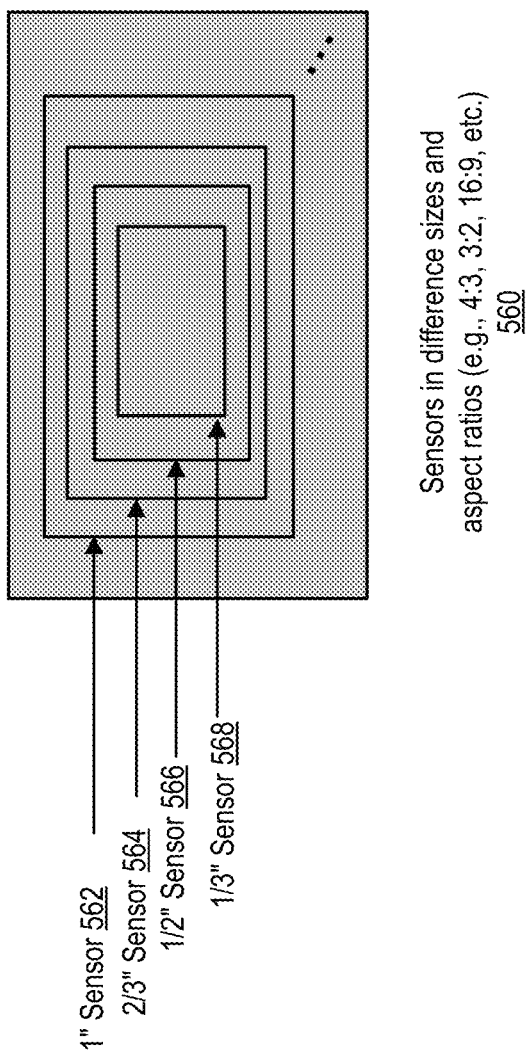
FIG. 5C illustrates a set of exemplary image sensor formats.

FIG. 5C illustrates a set of exemplary image sensor formats. A digital camera uses a lens with a diaphragm to focus light onto an image sensor. The lens may be a fixed focal length lens that has the ability to be focused for different distances, and it may also be a fixed focus lens that is intended for use at a single, specific working distance.

An image sensor (also referred to as imager) is a sensor that detects and conveys information used to make an image. The image sensor may be a semiconductor charge-coupled devices (CCD) sensor, Quanta image sensor (QIS), or an active pixel sensor in complementary metal-oxide-semiconductor (CMOS) or N-type metal-oxide-semiconductor (NMOS, Live MOS) technologies. Embodiments of the invention apply to image sensors implemented in different technologies. Note that an image sensor may have an active area that is smaller than the size of the image sensor, and it is the area of the image sensor on which image is formed in a given mode of a camera. For simplicity of discussion, it's assumed that the active area is substantially equal to the size of the image sensor; and when they are not equal, embodiments of the invention concern the active area of the image sensor and the orientation of the active area as the active area is where the image is formed.

The image sensor format of a camera is the shape and size of an image sensor. The image sensor format determines the angle of view of a particular lens when used with a particular sensor. Sensor size of an image sensor is often expressed as optical format in inches (often shorthanded using the double prime as shown in the figure) or millimeters (mm). The exemplary sensors in the figure include a 1-inch sensor 562, a ⅔-inch sensor 564, a ½-inch sensor 566, and a ⅓-inch sensor 568. Each image sensor includes numerous sensors for pixels (also referred to as picture elements or pels) to capture images/videos, and these numerous sensors are referred to as pixel sensors. The pixel sensors are typically distributed evenly on the image sensor to arrive at a uniform image resolution, but embodiments of the invention do not require the uniformity of the pixel sensor distribution on the image sensor.

Each sensor has a respective aspect ratio. An aspect ratio of a geometric shape is the ratio of its size in different dimensions. The image sensors of a camera are often in the shape of a rectangle (also referred to as an oblong to exclude a square as a type of rectangle). While typical aspect ratios include 4:3, 3:2, and 16:9, as shown at reference 560 in FIG. 5C, embodiments of the invention apply to other aspect ratios for image sensors. Note that an image sensor may have an active area that is smaller than the size of the image sensor. The active area is the area of the image sensor on which image is formed in a given mode of a camera. For simplicity of discussion, it's assumed that the active area is substantially equal to the size of the image sensor.

Figure 6:
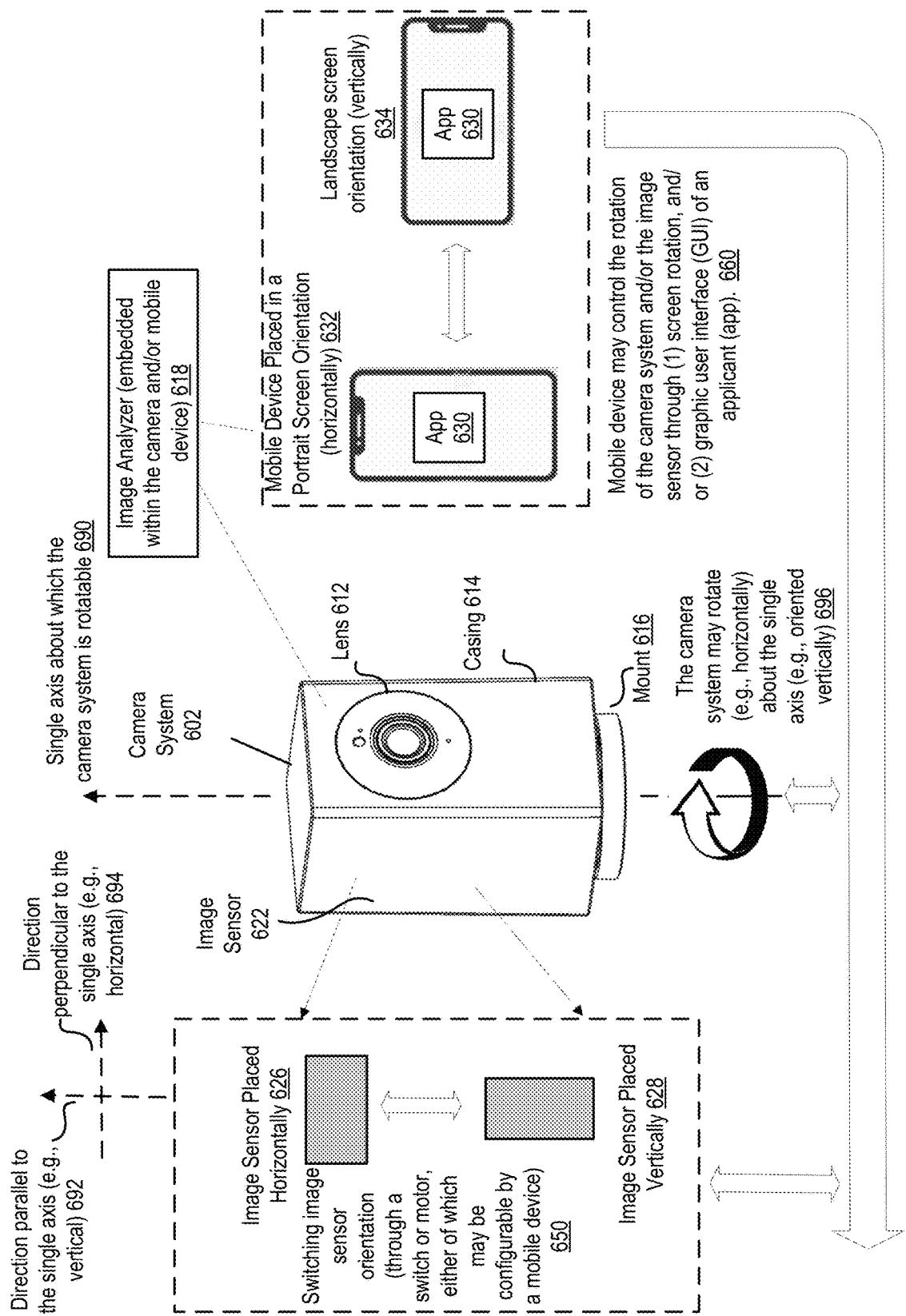
FIG. 6 illustrates the operations of a camera system according to one embodiment of the invention.

FIG. 6 illustrates the operations of a camera system according to one embodiment of the invention. In this embodiment, a camera system 602 includes a lens 612, a casing 614, a mount 616, an image sensor 622, which is not visible in the view, but is shown at two different orientations as the image sensor placed horizontally at reference 626 and the image sensor placed vertically at reference 628. The image sensor's orientation can be switched between the two orientations through a switch or a motor, either of which may be configurable by a mobile device as shown at reference 650.

A single axis about which the camera system 602 is rotatable is shown at reference 690, and the rotation of the camera system 602 about the single axis, where the rotation may be caused by the mount 616 or a motor within the camera system 602 shown at reference 696. For reference, the axis directions are shown as the direction parallel to the single axis at reference 692, and the direction perpendicular to the single axis at reference 694.

As shown, the controlling electronic device to control the camera system 602 is a mobile device, which includes a mobile application 630. The mobile application 630 is similar to the camera application 222, and it may include the camera rotator 223, lens and image sensor rotator 224, GUI 225, and optionally the image analyzer 206. The mobile device may be placed in a portrait screen orientation or a landscape screen orientation, as shown at references 632 and 634, respectively. The mobile device may detect its own orientation, and the application 630 obtains the detected orientation, and causes the image sensor to rotate/switch to the orientation accordingly. Note as explained at reference 618, an image analyzer may be implemented in either the camera system 602 or the mobile application 630.

The mobile device may control the rotation of the camera system 602 and/or the rotation/switch of the image sensor 622 (and the lens 612 when both are in a single assembly) through (1) screen rotation, and (2) GUI as shown at reference 660. These operations are discussed in more details relating to FIG. 2.

Operations Per Some Embodiments

The operations in the flow diagrams may be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 7:
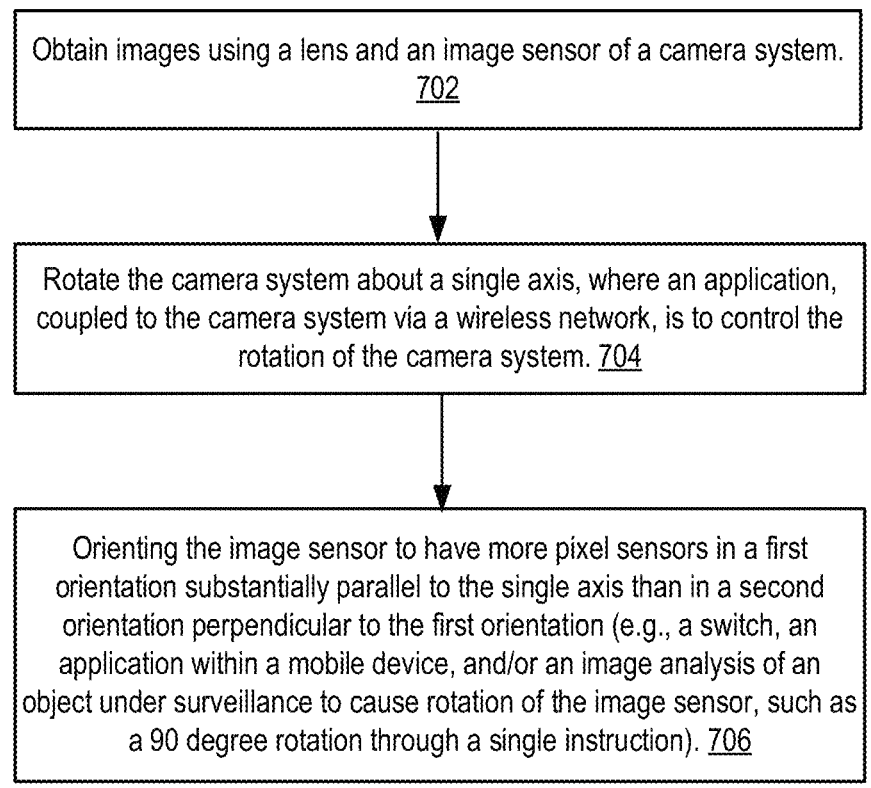
FIG. 7 is a flow diagram illustrating the operations at an electronic device for control of a camera system according to some embodiments of the invention.

FIG. 7 is a flow diagram illustrating the operations at an electronic device for control of a camera system according to some embodiments of the invention. The electronic device may be a controlling electronic device 220 such as a mobile device in an embodiment, and it may remotely control a camera or camera system such as the ones at references 202, 502, or 602. The camera system may include a lens, an image sensor, a housing, and/or a mount. The lens may be a fixed focal length lens that has the ability to be focused for different distances, and it may also be a fixed focus lens that is intended for use at a single, specific working distance.

At reference 702, images are obtained using the lens and the image sensor of the camera system. At reference 704, the camera system is rotated about a single axis, wherein an application, coupled to the camera system via a wireless network, is to control the rotation of the camera system. At reference 706, the image sensor is oriented to have more pixel sensors in a first orientation substantially parallel to the single axis than in a second orientation perpendicular to the first orientation.

In one embodiment, the image sensor is to be fixed in an orientation (e.g., vertical orientation) so that the active area of the image sensor has the longer sides perpendicular to the placement plane of the camera system.

In one embodiment, the image sensor having more pixel sensors in the first orientation is caused by the electronic device to control a switch within the camera system to rotate the image sensor (e.g., to the first orientation), and the rotation by the switch is independent from the rotation of the camera system. In one embodiment, the switch has two pre-defined orientations to choose from, thus the switch operation may be to switch the image sensor either from a horizontal orientation to a vertical orientation, or from the vertical orientation to the horizontal orientation. In one embodiment, the switch may be a mechanical mechanism without using an electronic motor. In that case, a user of the camera system may operate on the switch directly without using the electronic device.

In one embodiment, the image sensor having more pixel sensors in the first orientation is caused by the electronic device to control a motor within the camera system to rotate the image sensor (e.g., to the first orientation), and the rotation by the motor is independent from the rotation of the camera system. Note that the rotation of the camera system as a whole may be also caused by a set of motors, but that set of motors are likely to be finer-grained motors than the motor to rotate the image sensor as the former needs to perform operations such as panning and they may be operated in a variety of speeds.

In one embodiment, the application is within a mobile device, and wherein the application includes a graphics user interface (GUI) through which an operator causes the image sensor to rotate (e.g., from the first orientation to the second orientation and vice versa). In one embodiment, the mobile device switching to a landscape screen orientation causes the image sensor to be placed horizontally, and wherein the mobile device switching to a portrait screen orientation causes the image sensor to be placed vertically.

In one embodiment, an image analyzer determines an optimal orientation of the image sensor based on detection of an object under surveillance, and the determination of the optimal orientation causes the image sensor to rotate to the optimal orientation. For example, the image analyzer determines where is the face of a human body under surveillance, and whether the image sensor is in the optimal orientation to cover the whole human body. If the image analyzer determines that a part of the face is cut off in the current image sensor orientation, it may determine that the other image sensor orientation is the optimal orientation and cause the image sensor to rotate to the optimal orientation.

In one embodiment, a single instruction from the application causes the image sensor to rotate ninety degrees. In one embodiment, the application is within a mobile device, and a finger swipe or tap on the mobile device causes the camera system to rotate. In one embodiment, another finger swipe to tap on the mobile device causes the image sensor to rotate.

In one embodiment, the camera system comprises a single assembly including both lens and image sensor, and the image sensor having more pixel sensors in the first orientation substantially parallel to the single axis than in the second orientation perpendicular to the first orientation is caused by rotating the single assembly.

The operations and the camera system discussed herein may be widely used in surveillance, video conferencing, live production, lecture capture, distance learning, and other variety of applications. In some embodiments of the invention, the image sensor is fixed in one orientation (e.g., the vertical orientation) so that the image sensor has more pixel sensors in the orientation substantially parallel to a single axis than in a second orientation perpendicular to the first orientation, where the camera system is rotatable about the single axis. In some embodiments, the image sensor is rotatable, and the rotation of the image sensor is independent from the rotation of the camera system.

As explained herein, the rotation of the camera system about the single axis (e.g., panning) may use a set of fine-grained motors, while the rotation of the image sensors may use a coarse-grained motor or a switch. That is, the rotation of the image sensors replaces the rotation of the camera system about another axis (e.g., tilting) using another set of fine-grained motors. Since the coarse-grained motor or switch is cheaper than the fine-grained motors, the resulting camera systems cost less to manufacture and maintain, thus they can be sold cheaper and be deployed in more applications that what the PTZ cameras may be deployed.

In some camera systems, the lens and image sensors are included in a single assembly, and the single assembly is switchable between a first orientation and a second orientation perpendicular to the first orientation. When the switching between the two orientations is controlled by an application (e.g., the camera application 222), these camera systems may achieve a sufficient coverage without resorting to the set of fine-grained motors (e.g., for panning or tilting). That is, the rotation of the image sensors replaces the rotation of the camera system as a whole in any axes. Without any set of fine-grained motors, these camera systems can cost even less.

In other words, the camera systems in embodiments of the invention reduce hardware requirements to rotation/switch, and thus may be cheaper to manufacture and/or easier to maintain than the traditional PTZ cameras.

Operating Environments and Implementations

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A wireless network (also referred to as a cellular network) is a network of devices communicating using radio waves (electromagnetic waves within the frequencies 30 KHz-300 GHz). A wireless communication may follow wireless communication standards, such as new radio (NR), LTE (Long-Term Evolution), LTE-Advanced (LTE-A), wideband code division multiple access (WCDMA), High-Speed Packet Access (HSPA), WiFi (wireless fidelity), and Bluetooth. Furthermore, the communications between the devices such as network devices and mobile devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

A communications network includes one or more wireless and/or wireline networks, and it allows a user of a digital camera system to control one or more digital cameras remotely across networks such as wide area networks (WANs), metropolitan area networks (MAN), local area networks (LANs), internet area networks (IANs), campus area networks (CANs), and virtual private networks (VPNs). Entities in the communications networks, such as mobile devices and digital cameras, may be given Internet Protocol (IP) addresses for identification, and the IP addresses may be IP Version 4 (IPv4) or IP Version 6 (IPv6).

A mobile device may access a wireless communication network and receive services from the wireless communication network. A mobile device may be a user equipment (UE), which may be a subscriber station, a portable subscriber station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a gaming terminal device, a music storage and playback appliance, a vehicle-mounted wireless terminal device, a smart speaker, a set-top box, and a customer premise equipment (CPE). Note that while smart phones are often used as examples of mobile devices in this specification, embodiments of the invention apply to other mobile devices as well.

Figure 8:
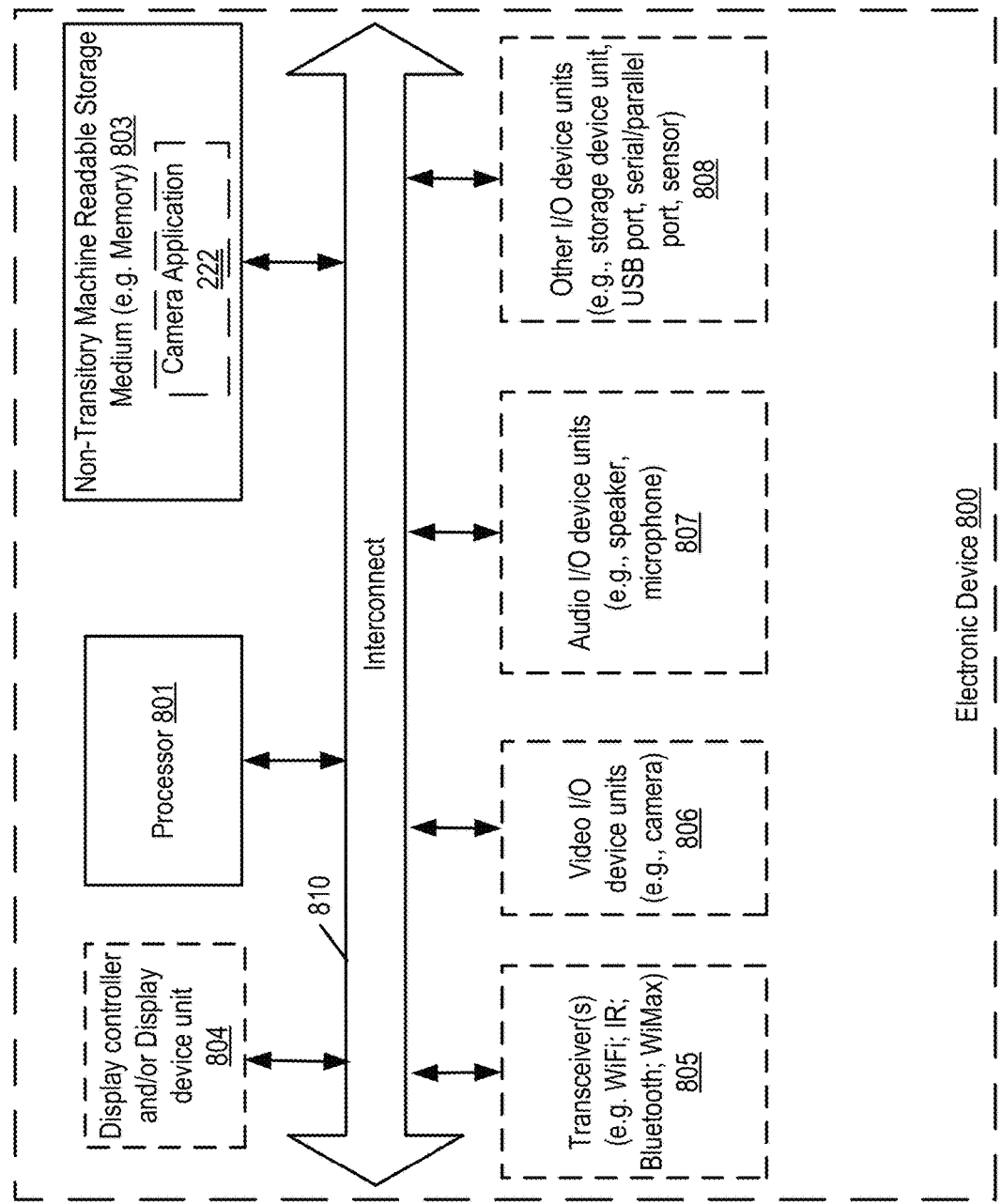
FIG. 8 is a block diagram illustrating an electronic device that may implement a camera application according to one embodiment of the invention.

FIG. 8 is a block diagram illustrating an electronic device that may implement a camera application according to one embodiment of the invention. The electronic device 800 may be the controlling electronic device 220 in some embodiment. The electronic device 800 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that electronic device 800 is intended to show a high-level view of many components of the computing system. However, it is to be understood that additional components may be present in certain implementations and furthermore, different arrangement of the components shown may occur in other implementations.

In one embodiment, the electronic device 800 includes a processor 801, a non-transitory machine-readable storage medium 803, and optionally device units 804-808 that are interconnected via a bus or an interconnect 810. A processor 801 may represent a single processor or multiple processors with a single processor core or multiple processor cores included therein. The processor 801 may represent one or more general-purpose processors such as a microprocessor, a central processing unit (CPU), or processing device. More particularly, the processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 801 may communicate with non-transitory machine-readable storage medium 803, which in an embodiment can be implemented via multiple memory devices to provide for a given amount of system memory. The non-transitory machine-readable storage medium 803 may include one or more volatile storage (or memory) devices such as random-access memory (RAM), dynamic RAM (DRAM), synchronous DRAM (SDRAM), static RAM (SRAM), or other types of storage devices. The non-transitory machine-readable storage medium 803 may store information including sequences of instructions that are executed by the processor 801, or any other device units. For example, executable code and/or data of a variety of operating systems, device drivers, firmware (e.g., input output basic system or BIOS), and/or applications can be loaded in the non-transitory machine-readable storage medium 803 and executed by the processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

The non-transitory machine-readable storage medium 803 contains the camera application 222 to perform the operations discussed above.

The electronic device 800 may optionally further include input/output (I/O) devices such as the device units 804-808, including display control and/or display device unit 804, wireless transceiver(s) 805, video I/O device unit(s) 806, audio I/O device unit(s) 807, and other I/O device units 808 as illustrated. The wireless transceiver 805 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The electronic device 800 may also include an ultrasound device unit (not shown) for transmitting a conference session code.

The video I/O device unit 806 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 807 may include a speaker and/or a microphone to facilitate voice-enabled functions, such as voice recognition, voice replication, digital recording, and/or telephony functions. Other optional devices 808 may include a storage device (e.g., a hard drive, a flash memory device), universal serial bus (USB) port(s), parallel port(s), serial port(s), a printer, a network interface, a bus bridge, sensor(s) (e.g., a motion sensor such as an accelerometer, gyroscope, a magnetometer, a light sensor, compass, a proximity sensor, etc.), or a combination thereof. The optional device units 808 may further include certain sensors coupled to the interconnect 810 via a sensor hub (not shown), while other devices such as a keyboard or thermal sensor may be controlled by an embedded controller (not shown), dependent upon the specific configuration or design of the electronic device 800.

Note that while the electronic device 800 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

Environment Utilizing Embodiments of the Invention

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A camera system, comprising:
   a lens; and
   an image sensor,
   wherein a single assembly includes both of the lens and the image sensor, wherein the single assembly is switchable only between a first orientation and a second orientation perpendicular to the first orientation, wherein the single assembly stays only in either the first orientation or the second orientation, wherein an application within a mobile device controls the switch of the single assembly only between the first orientation and the second orientation, and wherein the image sensor is caused to have more pixel sensors in the first orientation through controlling a switch or a motor within the camera system to cause the image sensor to switch to the first orientation.

2. The camera system of claim 1, wherein the camera system further comprises an image analyzer that determines an optimal orientation of the image sensor based on detection of an object under surveillance, and wherein the determination of the optimal orientation causes the image sensor to rotate to the optimal orientation.

3. The camera system of claim 1, wherein the application includes a graphics user interface (GUI) through which an operator causes the single assembly to switch between the first and second orientations.

4. A non-transitory machine-readable storage medium that provides instructions that, when executed, cause a mobile device to perform:
   obtaining images using a lens and an image sensor of a camera system;
   rotating the camera system about a single axis only, wherein an application within the mobile device is to control the rotation of the camera system; and
   orientating the image sensor to have more pixel sensors in a first orientation substantially parallel to the single axis than in a second orientation perpendicular to the first orientation, and wherein the image sensor is caused to rotate independently from the rotation of the camera system, wherein the image sensor is caused to have more pixel sensors in the first orientation through controlling a switch or a motor within the camera system to cause the image sensor to rotate to the first orientation.

5. The non-transitory machine-readable storage medium of claim 4, wherein screen rotation of the mobile device causes the image sensor to rotate.

6. The non-transitory machine-readable storage medium of claim 4, wherein a finger swipe on the mobile device causes the image sensor to rotate independent from the rotation of the camera system.

* * * * *